(12) United States Patent
Vincenz

(10) Patent No.: US 8,651,212 B2
(45) Date of Patent: Feb. 18, 2014

(54) BATTERY HOLDER

(75) Inventor: Droux Vincenz, Biel/Bienne (CH)

(73) Assignee: Fairly Bike Manufacturing Co., Ltd., Taipei Hsien (TW)

( * ) Notice: Subject to any disclaimer, the term of this patent is extended or adjusted under 35 U.S.C. 154(b) by 19 days.

(21) Appl. No.: 12/805,811

(22) Filed: Aug. 19, 2010

(65) Prior Publication Data

US 2011/0042156 A1 Feb. 24, 2011

(30) Foreign Application Priority Data

Aug. 20, 2009 (CH) ........................................ 1291/09

(51) Int. Cl.
  *B60R 16/04* (2006.01)
(52) U.S. Cl.
  USPC .................. 180/205.1; 180/206.1; 180/206.4; 180/207.1; 180/207.3
(58) Field of Classification Search
  USPC ........... 180/205.1, 206.1, 206.4, 207.1, 207.3
  See application file for complete search history.

(56) References Cited

U.S. PATENT DOCUMENTS

| | | | |
|---|---|---|---|
| 4,814,951 A * | 3/1989 | Larsen | 362/473 |
| 5,570,752 A * | 11/1996 | Takata | 180/206.4 |
| 5,618,052 A | 4/1997 | Rendall | |
| 5,789,898 A * | 8/1998 | Suzuki et al. | 320/104 |
| 5,842,714 A * | 12/1998 | Spector | 280/288.4 |
| 6,016,882 A * | 1/2000 | Ishikawa | 180/207.3 |
| 6,158,881 A * | 12/2000 | Carne | 362/473 |
| 7,117,966 B2 * | 10/2006 | Kohda et al. | 180/68.5 |
| 7,393,125 B1 | 7/2008 | Lai | |

FOREIGN PATENT DOCUMENTS

| | | |
|---|---|---|
| DE | 2 124 274 A1 | 11/1972 |
| EP | 0 080 024 A1 | 6/1983 |
| EP | 2 423 096 A2 | 2/2012 |
| JP | 10-53178 A | 2/1998 |
| JP | 2000-272567 A | 10/2000 |

OTHER PUBLICATIONS

European Seach Report dated Feb. 8, 2013 for EP 13 00 0087.

* cited by examiner

*Primary Examiner* — Kevin Hurley
*Assistant Examiner* — Michael Stabley
(74) *Attorney, Agent, or Firm* — Birch, Stewart, Kolasch & Birch, LLP

(57) ABSTRACT

The invention relates to a battery holder which is configured to be inserted into the tube opening in the seat tube of the frame of an electric bicycle and to be pulled out. The bicycle saddle is connected to the battery holder via a saddle pillar.

28 Claims, 5 Drawing Sheets

BATTERY HOLDER

TECHNICAL FIELD

The invention relates to a battery holder and to a seat tube of the frame of an electric bicycle for accommodating a battery holder. The battery holder is configured to be inserted into the tube opening in the seat tube of the frame of the electric bicycle and to be pulled out.

PRIOR ART

An electric bicycle differs from a customary bicycle in having an additional electric motor, a sensor for sensing pedalling parameters, control electronics for the electric motor, and a battery or an accumulator.

The electric motor may be embodied as a wheel hub motor for directly driving the front wheel or rear wheel. In another embodiment, the electric motor drives a chain or a toothed belt of one of the wheels via a gear mechanism. Predominantly three different designs—a hub motor on the front or rear wheel, a crankshaft motor as an additional force acting on the foot pedal or an electric motor on a trailer or push-type trailer (exotic design)—are used as force application points of the electric motor.

The sensor for sensing pedalling parameters is usually installed on the bottom bracket, and monitors, for example, the pedalling frequency or the force supplied by the driver during pedalling, which force acts as torque on the foot pedal shaft.

The control electronics for the electric motor control the power of the electric motor according to the driver's request and the sensed pedalling parameters. For this purpose, setting possibilities such as an infinitely variable pedalling force assistance means, or a desired pedalling force assistance means which is divided into stepped-down stages, which are processed together with the pedalling parameters, are provided (for example a rotary handle), wherein the power of the electric motor is controlled. Further functions can be integrated such as, for example, voltage monitoring of the battery or of the accumulator, temperature monitoring, power monitoring or rotational speed monitoring of the motor.

The battery or the accumulator will be referred to below as the accumulator. It is known to arrange the accumulator between the seat pipe and rear wheel (Flyer/Biketec), in a U shape around the seat pipe, in the lower pipe with an access door (Thömus, Kalkhoff, KogaMyiata), integrated into the luggage rack (WattWorld), integrated into the frame triangle (Dolphin), instead of the water bottle (BionX) or stowed on the bicycle in a handlebar pocket. For example, the accumulator can be removed from the bicycle in order to charge it. Holder devices for fastening the accumulator to the provided location on the electric bicycle in a removable fashion are known. A charging process for the accumulator can therefore be carried out, for example, overnight in a charging station. The accumulator can also be configured to connect a charge cable and to charge the accumulator directly on the electric bicycle. An accumulator may have supplementary parts such as, for example, a lock for protecting the accumulator on the electric bicycle against theft, a switch for switching the operation of the accumulator on or off, and a light which can serve as a rear light of the electric bicycle or a status display for the charge state of the accumulator. The control electronics of the electric motor or components of these control electronics can at the same time be integrated into the accumulator.

Apart from the electric motor, the accumulator is the most important part of the electric bicycle. Depending on the application, the accumulator is used in different voltage designs, technology designs and capacitance designs. Owing to the large number of requirements, all customary types of technology are used: lead ion accumulator cells, nickel-cadmium ion accumulator cells, nickel-metal-hydride ion accumulator cells and lithium ion accumulator cells with 12, 24 or 36 V and with capacitances of approx. 4 to 25 Ah.

NiMH ion accumulators, NiCd ion accumulators or lithium ion accumulators are generally used. The accumulator charge is up to 18 ampere hours (Ah) at 24 or 36 Volts (V) here. The stored energy is therefore up to 648 Watt hours (Wh). NiCd accumulators have in the (theoretical) ideal case 85% of their original capacity after 1000 charges and are therefore considered to be worn out. With NiMH accumulators, approximately 400 to 800 charge cycles are possible. However, the durability of accumulators depends on other factors. The voltage supplied by lead accumulators decreases as discharging progresses, so that the full motor power is no longer reached. The particularly lightweight but expensive lithium ion accumulators are now being used by most manufacturers. In the near future, the first lithium polymer accumulators, which permit relatively high energy contents with the same weight, will be available. The reliability and durability of lithium accumulators has been proven in practice. However, the chemical composition and the quality of the electronics are decisive for reliability. Lithium ion accumulators may react very strongly in particular in the event of a short circuit or overvoltage. This has already led to product recalls in the case of laptops.

There are also first trial models which are compatible with practical conditions and in which the accumulator has been replaced by a fuel cell and a hydrogen tank. This design provides the advantage that charge times and accumulator wear are dispensed with and that in a relatively long tour additional tanks can be carried along with the electric bicycle.

Manufacturers which equip their electric bicycles with NiCd accumulators also generally supply a power pack which completely discharges the NiCd accumulator before the actual charging process, in order to reduce the memory effect. NiMH accumulators have a substantially smaller memory effect. Said effect is avoided altogether in lithium ion accumulators.

Lithium-iron-phosphate accumulators, which have significantly longer service lives than the currently preferably used lithium ion accumulators, are also very promising. Their use could significantly reduce the running costs due to accumulator wear. At present, they are not yet available on a series-production basis in most electric bicycle models.

The type of motor assistance has, inter alia, consequences in terms of driver's licences in countries of the EU, and for this reason the following categories are differentiated:

Bicycle with limited pedalling assistance, referred to as Pedelec or E-Bike,

Bicycle with unlimited pedalling assistance, referred to as Pedelec or E-Bike,

Bicycle with additional drive which is independent of pedalling, referred to as E-Bike or E-Roller [electric moped], and Bicycle with independent additional drive, referred to as E-Scooter.

A bicycle with limited or restricted pedalling assistance is referred to in Germany as Pedelec, but the expressions E-Bike, Elektrorad or Elektrovelo are also used. The term limited pedalling assistance means that the electric motor is switched on when the pedals are operated. The electric motor therefore merely assists, and does this only for as long as the vehicle has not exceeded a speed of 25 km/h. EU guidelines limit the average power of the motor to 250 W. E-Bikes with speed limitation permit locomotion without having to make a large effort. The means of transportation referred to here is officially considered to be a bicycle. In Switzerland, it has to be insured as a bicycle; wearing a helmet is recommended but not prescribed.

In the terminology used in Switzerland, a differentiation is not made between the abovementioned limited pedalling assistance and an electric bicycle with unlimited pedalling assistance. Both types of vehicle are referred to as E-Bikes or Elektrovelos. An electric bicycle with unlimited pedalling assistance functions like an electric bicycle with limited pedalling assistance, but the pedalling assistance is not switched off when a limiting speed is exceeded, and speeds of up to 45 km/h can be reached. An electric bicycle with unlimited pedalling assistance has to have a moped number plate in Switzerland, and must also be insured as a moped. Wearing a helmet is recommended, but not prescribed. Apart from the relatively high speed, electric bicycles with limited and unlimited pedalling assistance only differ to a small extent in terms of their handling and riding behaviour, the difference resides in the legal position.

Nowadays, modern electric bicycles have NiMh accumulators or lithium polymer accumulators which have proven themselves in use (large range and service life, no memory effect). LiFePo accumulators with relatively high energy density and operational reliability as well as relatively short charge cycles are new on the market. In terms of cost they are similar to Li-ion accumulators.

Electric bicycles have a range which is restricted by the charge capacity of the accumulator. This charge capacity becomes shorter the steeper the profile of the route. It is not possible to "fill up the tank" again within a few minutes as in a petrol-operated vehicle, but rather a recharging cycle takes several hours, depending on the model. However, in contrast to motorcycles, electric bicycles accelerate quietly and do not make any local contribution to the formation of ozone and smog.

U.S. Pat. No. 5,618,052 presents a saddle pillar, to whose end a bicycle saddle is fastened. The saddle pillar can be inserted into a conventional seat tube of a bicycle. A power supply unit with a battery is arranged in the saddle pillar. A dynamo unit, in particular a rear light, which is attached to the bicycle saddle, can be supplied with electrical energy using the power supply unit.

U.S. Pat. No. 7,393,125 presents a power supply unit with a battery arranged therein. The seat tube of a bicycle frame has, over essentially its entire length, an opening into which the power supply unit can be inserted laterally and secured. The battery is configured to supply the electric motor of an electric bicycle with power.

Current solutions from the prior art in which the accumulator is integrated into the frame generally prevent simple mounting/removal. Access openings with corresponding closure mechanisms are installed in the tube structure. The accumulator has to be secured in the tube by means of a structure. Corresponding seals are required. These structures are to a certain extent complex and expensive to produce. The frame is weakened at the access openings and must be correspondingly reinforced. This may result in a relatively high frame weight. The aesthetic effect of the existing solution is unsatisfactory. The accumulators are tailored only to the power supply of the electric bicycle and do not provide any additional functions such as, for example, use as a computer or multimedia player. The accumulators cannot be customized and no personal data can be stored or selectively retrieved or checked.

SUMMARY OF THE INVENTION

The object of the present invention is to provide a battery holder which can be easily mounted on an electric bicycle and removed without aesthetic disadvantages or considerable aesthetic disadvantages having to be accepted in terms of the design of the electric bicycle. The battery holder is to be used, together with a battery/accumulator provided therein, not only for feeding the electric motor and, if appropriate, other electrical loads of the electric bicycle such as, for example, the bicycle lamp, but also as a mobile energy source with various additional functions when it has been released from the electric bicycle.

The means of achieving the object is defined by the features of claim 1. According to the invention, a bicycle saddle can be connected to the battery holder via a saddle pillar.

A battery, an accumulator, a fuel cell or some other energy store is arranged as a power supply or energy supply for the electric bicycle in the battery holder. The seat tube has an opening for receiving the saddle pillar at the upper end, but the space in the seat tube lies largely unused. By virtue of the fact that a bicycle saddle can be connected to the battery holder via a saddle pillar and the battery holder is configured to be inserted into the seat tube and pulled out, the battery holder can easily be mounted and removed without aesthetic disadvantages or considerable aesthetic disadvantages having to be accepted, since the battery holder is arranged in a space which is otherwise unused. The battery holder with the battery or the accumulator arranged therein can therefore easily be inserted from above, together with the bicycle saddle, into the seat tube and secured, if appropriate. The bicycle saddle is therefore connected to the battery holder and not directly to the frame, and forces from a person sitting on the saddle are transmitted from the bicycle saddle to the battery holder and the seat tube via the saddle pillar. The seat tube can be used in an optimum way as a single open tube for the frame of the electric bicycle for fastening the battery holder and the battery or accumulator arranged therein. This does not require any complex fastening mechanisms. There is no need for any tubes to be weakened by additional opening holes.

The bicycle saddle is removed from the bicycle together with the battery holder as a removable unit. This prevents theft of the bicycle saddle or of the battery. It is not attractive to steal the bicycle without a saddle, and it is therefore rather improbable. Taking the electric bicycle without its saddle will attract attention (for example of the police) and imply that it has been stolen. Social control is therefore present. This signifies increased protection against theft compared to conventional systems.

Since the saddle is removed together with the battery holder, the saddle is prevented from becoming soaked in rain.

As a result of the simultaneous removal of the saddle with the battery holder as a removable unit, effective and user-friendly access to the battery from above is ensured. The user operates the device in an upright, standing position, which is therefore particularly comfortable.

This provides new design potential for electric bicycles.

The battery holder comes to rest at a defined position within the seat tube. This permits a lock which engages over multiple components to be installed (quick-action fastener/ battery holder and quick-action fastener/tube cover).

The defined position and the associated defined upper termination of the battery holder (offset with respect to the seat tube, cover face) provides the possibility of implementing a protective projection, integrated into the quick-action fastener, for protecting the electrical contacts which are located on the upper side of the tube cover.

By virtue of the defined position of the battery, it is possible to implement an embodiment of a protruding edge in the battery cover, which protruding edge additionally prevents dirt and rain water from penetrating the seat tube.

By virtue of the defined position of the battery holder, a defined area of the battery holder which is protected against the weather and vandalism is defined and electronic components (display, loudspeaker) can be accommodated on said area.

The battery holder which is removed from the electric bicycle, together with the displaceable saddle pillar, can be used as a stool (for commuters) which is height-adjustable, (incl. power connection for laptop).

If the saddle pillar is not retracted after the battery holder has been taken out, it is not necessary to adjust the sitting height after renewed installation of the battery holder because of the defined position.

A lowerable, hydraulic saddle pillar can advantageously be used as the saddle pillar. The saddle pillar can very easily be set to the lowest position, which reduces the packed dimensions, for transportation. When the battery holder is mounted, the saddle pillar in turn can be very easily set to the preferred riding position without renewed vertical adjustment being necessary.

It is possible to use commercially available, sprung saddle pillars.

If the height of the saddle is respectively adjusted in daily use, it is possible to set the seat height after installation of the battery holder by displacing the lightweight saddle pillar, which leads to significantly easier handling compared to displacement of the much heavier battery holder.

The defined position of the battery holder permits a simple structure of the power collector. It is not necessary to run cables in the tube in a movable fashion. A lateral power collection by means of a rail and spring is not necessary either. Advantages are therefore obtained in respect of the resistance against influences of the weather, in terms of the seal and in terms of wear.

The circuit is made possible only when the pillar is completely fully sprung, giving rise to improved safety.

The battery can be removed without stooping and without fiddly work, for example opening flaps.

The structure of the frame is not weakened.

The battery holder is considered to be a fully functioning, independent component of the bicycle and is "connected between" the frame and the saddle pillar.

A low centre of gravity of the bicycle together with small packed dimensions of the battery holder seat unit are possible.

A saddle pillar, which is visually thin in the region between the saddle and bicycle frame, is possible thanks to the defined position of the battery and the straight termination (offset). If the saddle pillar could not be displaced with respect to the battery holder, the aimed-at area for setting the seat height within the battery holder would have to have a constantly large cross section.

The cross-sectional area of the battery holder is preferably larger than the cross-sectional area of the saddle pillar, in particular 2 to 20 times larger.

A relatively large cross-sectional area provides, in particular, space for a battery or an accumulator with a relatively large capacity. This space is provided by a correspondingly configured seat tube, while an aesthetically pleasing selection can be made for the shape of the cross-sectional area.

Alternatively, the cross-sectional area of the battery holder is approximately of the same size as or smaller than the cross-sectional area of the saddle pillar. In this case, the battery holder can be arranged in a saddle pillar which is configured in the usual way. However, in this case with contemporary batteries and accumulators it is difficult to obtain a satisfactory capacity.

The saddle pillar is preferably attached to the battery holder in such a way that it can be displaced in relation to the battery holder.

The displaceability can be ensured, in particular, with respect to the direction of the seat tube. It is therefore possible for the battery holder to be inserted completely into the seat tube and for the ability to adjust the height of the bicycle saddle to nevertheless continue to be ensured. This keeps the centre of gravity of the electric bicycle as low as possible.

Alternatively, the saddle pillar is arranged in a fixed fashion with respect to the battery holder. The setting of the height of the bicycle saddle has to be carried out by correspondingly displacing the battery holder in the seat tube, as a result of which the centre of gravity is also displaced. Since the weight of batteries arranged in the battery holder makes up a significant portion of the weight of the electric bicycle, such displacement of the centre of gravity can have a disadvantageous effect on the riding behaviour of the electric bicycle.

The battery holder preferably has a substantially oval cross-sectional face or a cross-sectional face which is composed of a plurality of oval, straight or round segments, and the saddle pillar has a substantially round cross-sectional face, wherein the saddle pillar is guided so as to be displaceable in a round or oval tube which is attached to the battery holder, and said saddle pillar can be locked to a quick-action closure.

As a result of the oval cross-sectional face of the battery holder, space for accommodating a battery or an accumulator with a sufficient capacity is provided in an aesthetic way. The round tube which is provided in the battery holder can be embodied, in particular, in accordance with the round cross-sectional face of commercially available saddle pillars. The seat tube is shaped in accordance with the oval cross-sectional face of the battery holder, an oval seat tube also having stability advantages over a rectangular seat tube.

A pull-out strap is preferably arranged on the battery holder.

The strap can be arranged, for example, in the abovementioned round tube for accommodating the saddle pillar and can be automatically pulled back into the round tube or pushed manually into the tube after use by means of a return mechanism such as a spring-loaded device. The strap can also be wound, for example, onto a roller, similar to a car seat belt, and pulled out of the battery holder. It is therefore possible for a user of the electric bicycle to park it in a bike park, to remove the battery holder together with the bicycle saddle as a removable unit and to conveniently carry it along by the strap, that is to say for example hang it over his shoulder. This ensures that the battery holder with the battery or accumulator arranged therein becomes a personal object which can be conveniently carried along.

The lower part of the battery holder may have a rubberized sole. This serves as a protection when the battery holder is placed on the ground. The battery holder together with a bicycle saddle arranged on it can also be used as a stool. The rubberized sole serves here as a protection and prevents slipping.

Electrical and/or electronic components, such as, in particular, a battery or an accumulator, a charge station for charging the battery or the accumulator, a transformer, a charge state display, a power connection for the power supply of the electric bicycle, a power connection for external devices, a lamp, a computer module, a wire-bound or wireless interface, a display, loudspeaker and/or a global positioning system module, are preferably attached to the battery holder.

By means of electrical and/or electronic components, the battery holder can be additionally further developed in order to improve further its appeal as a personal object.

For example, a power connection can be configured to supply power to a laptop/PC/Mac, emergency equipment, breathing equipment, radio devices, night vision devices, loudspeakers/amplifiers, a mobile phone charging device or a music player. The power connection can also be used as a cigarette lighter socket or as a USB (Universal Serial Bus) socket for these purposes.

A central processing unit can be provided as a computer module. Central processing unit is used in information technology to denote the part of a computer system which monitors and controls the other parts. In particular, the term central processing unit is used as a means of forming a delineation from peripherals. However, the meaning is heavily dependent on the particular context: for example, whether a single microchip or an entire PC is considered to be a central processing unit depends on the granularity with which the system is considered. The term is typically used for the following systems, depending on the context:
1. At the level of computer architecture, central processing unit usually means just the central processing unit. The main memory would then be, for example, part of the periphery. However, the term generally used is main processor, rather than central processing unit.
2. However, the arrangement with a CPU, main circuit board, hardware interfaces and sometimes also the main memory is frequently also referred to as a central processing unit. The hard disks, screen, keyboard and the like are then part of the periphery.
3. In a system which is built up from a plurality of computers, an entire computer (together with peripherals) which controls the other computers is also referred to as the central processing unit.

In the present design, the term central processing unit is defined according to point 2. The following techniques and standards are used as hardware interfaces: USB, USB2, Firewire, Bluetooth, Netzwerk, Audio (Jack, Minijack, Cinch), Multimediabuchse, EIA-232, PCI-bus, SCSI, Funk, card-reading device for credit cards and bank cards and post office cards.

The peripheral is a component or a device which is located outside the central processing unit of a computer. It is possible to differentiate in a simplified fashion between (internal) peripherals which are installed in the computer and (external) peripherals which are connected thereto by a cable (or else by infrared technology or radio technology).

Peripherals are used to input and output data or commands into the central processing unit. They provide a "service" for the user and said service can then either take place in a visible fashion (for example paper printout) or invisibly (for example signal conversion of internal modems).

For example, the following devices which are installed in the battery holder are used as peripherals: graphics card, network card, sound card, main memory, chip set, display/monitor, touch screen display, hard disk, keyboard, microphone, trackball, webcam, touchscreen, touchpad, Bluetooth interfaces or infrared interfaces, loudspeaker, power pack, modem, memory card reading device, mobile phone functions such as SMS/MMS transmission and reception.

An audio player can be provided for playing MP3 files or podcasts.

Components can be provided for carrying out standard programs.

By integrating a GPS system (GPS—Global Positioning System) it is possible, in particular, in conjunction with a route planner, to display information as a function of the location, or information can be displayed for a sightseeing tour.

A direction indicator with an arrow (lamp) can be arranged in a removable fashion on the battery holder. The direction indicator can comprise means for mounting the latter on the handlebars or front part of the electric bicycle, and in this context communication between the direction indicator and electronic components of the battery holder can take place via a wireless interface. Such a direction indicator can be used to communicate with the rider during a sightseeing tour, during a guided tour through an area or when riding with the electric bicycle.

An alarm system can be installed in the battery holder.

A quick-action closure for securing the battery holder can be attached to a seat tube for accommodating an abovementioned battery holder.

The mounting of the battery holder on the electric bicycle, and removal therefrom, can be additionally simplified with the quick-action closure.

Opposing contacts for forming an electrical connection between the power connection of the battery holder and electrical components such as, in particular, the motor of the electric bicycle are preferably attached in the seat tube.

The opposing contacts can be provided in a lower region of the seat tube where it is well protected and an electrical connection of the battery, holder or of the battery or accumulator arranged therein can only be made when the battery holder is virtually completely inserted. Alternatively, power can be transmitted to two longitudinal rails which are arranged in the seat tube and have corresponding power collectors arranged on the battery holder.

A cover is preferably displaceably guided in the seat tube, so that the tube opening in the seat tube is closed off in a weatherproof fashion when the battery holder is removed.

A helical spring or a pneumatic pressure spring is installed under the cover and connected thereto. The spring is located above the bottom bracket in the frame. A sliding guide can be provided as a guide for the battery holder and termination of the seat tube in the tube opening. When the battery holder is removed, the cover can be pressed in the upward direction with respect to the tube opening of the seat tube, against the sliding guide via the spring force. When the battery holder is taken out, it is pressed upward by the spring force and provides assistance for easier removal of the battery holder as a result of the reduced weight. This force can also be generated with a hydraulic or pneumatic system which is provided at another location on the bicycle. In fact, a coupling to one of the hydraulic or pneumatic systems of a spring-action fork, spring-action leg, brake or tyre is possible. The provision of a seal against the ingress of rain water is made possible at the contact point. On the upper side of the cover there is a positioning knob. This ensures precise fitting of the battery holder when it is inserted into the seat tube. On the upper side of the cover or on the positioning knob there are electrical contact points for the transmission of power. On the underside of the battery holder there are corresponding electrical contact opposing elements. In an inner region of the cover, the electric current is conducted from the upper side to the lower side or to the side faces. For the further design of the circuit there are two possibilities: on the one hand a direct connection, routed via wires, from the cover to the motor. Or else contact faces are located in the lower region of the seat tube, which contact faces bring about the contact through the cover to the battery holder when the battery holder is completely inserted. In the latter variant, the circuit is not made possible until the battery holder is completely installed, which provides additional safety. An accumulator which is arranged in the battery holder can be charged by means of a charging station in the removed state of the battery holder. It is also possible to charge the accumulator in the installed state by means of a low voltage connection (external to the transformer). In addition, it is to be possible to charge the accumulator directly by means of power systems customary in the country in question (approximately 220 V). For this purpose, the transformer is integrated directly into the battery holder. The charge station may be of a simple design (one plug-in position) or of multiple design (approximately 5-30 plug-in positions), and they are made available, for example at the entrance to large stores. While the person is, for example, in a large store or a restaurant etc., the battery can be charged for the payment of a fee or as a free service. For this purpose, a closure device (key, pin, badge, numerical lock, electronic lock) is provided at the charging station, and a corresponding plug and an element corresponding to the closure device are provided on the battery holder.

A protective projection is preferably provided on the quick-action closure so that, when the battery holder is removed, the electrical contact points which are attached to the cover are protected against influences of the weather.

A connection which is protected, in particular protected against theft, between the seat tube and the battery holder can preferably be produced with a closing device.

The situation-related advantages and handling possibilities are obtained as follows:

Situation of a commuter: the user travels with the electric bicycle from home to the station, places the electric bicycle in the device provided for this purpose (parking station), pulls out the battery holder and travels by train to his destination together with the battery holder and the attached bicycle saddle.

When the user arrives at the destination, he finds a corresponding parking station which is equipped with electric bicycles with the same technology. The battery holder, which the user carries with him, can be mounted in a free-standing electric bicycle, as a result of which said bicycle at the destination is available for use. The personal data of the user are stored, for example, in electronic components which are made on the battery holder, and said data are transferred automatically, for example, to the operator of the parking station when the battery holder is inserted, after which a lock for securing the electric bicycle in the parking station is opened. The duration of use of the electric bicycle can be recorded automatically. It is therefore possible for the electric bicycle to be deposited again at another parking station in the town, which saves costs and makes the electric bicycle available again to other users. The services corresponding to the period of use can be billed on a monthly basis, for example.

The advantages are that no expensive ticket for taking the bicycle along in a train is necessary, transport problems are reduced, precise billing is possible and the bicycles are in constant "use", i.e. the capacity is well utilized. A stolen electric bicycle is conspicuous since it would be ridden without a saddle, ensuring social control. Furthermore, it would be extremely unpractical to ride.

The commuter can also use the battery holder with a saddle as a seat at any time; for example when waiting on a platform or for sitting in overfilled trains. Elderly people and fishermen would appreciate this function.

The situation of a tourist (with personal battery/with rented battery): a tourist who is visiting an unfamiliar city is not in possession of a personal battery holder. This can be rented at the tourist information centre, for example against the presentation of his credit card details. The tourist's personal data can be stored electronically by the personnel for the hire period in the battery holder. The tourist can then get to know the town and use electric bicycles as he desires and deposit them again at suitable parking stations. The overall period of use can be in turn recorded and billed when the battery holder is returned. Since the tourist does not know his way about in an unfamiliar town, there is a selection of programmed sightseeing tours. These can be selected, for example, depending on the individual's personal interest (culture, chopping, sport, nature and parks, sights, gastronomy) and activated. The tourist is then directed from location to location through the town by means of, for example, a radio headset, a direction display on the bicycle or signal indicators in the handlebar grips. For this purpose, an integrated GPS is provided so that the respective location of the tourist is known to the sightseeing system.

The tourist can also move about freely in the town with the electric bicycle and listen, from time to time, to specific information about local features corresponding to his preselected preferences. This can also take place in conjunction with GPS technology or by means of locally provided signal generators (for example in information pillars) which call and play back the corresponding information on a data memory of the battery holder. If a tourist is already in possession of his own personal battery holder, he can also dispense with the visit to the tourist information centre with the aim of getting to know an unfamiliar town and he can load the route guide and the corresponding audio data directly onto the battery holder at home as a podcast from the Internet. The system provides the possibility of a new source of advertising. The system can therefore, for example, describe the direct route to a specific business or restaurant. The companies pay corresponding fees. A tourist can also make tours through entire countries (provided that all the existing parking stations have corresponding electric bicycles). To do this, at a starting point he rents a battery holder which is personalized. He then travels along his selected route. This route can also be interrupted, for example, by train journeys or boat journeys. The electric bicycle would then be left at a respectively corresponding parking station and only the battery holder would be taken along. At another railway station or docking point he would then pick up a new electric bicycle and carry on his journey. Personal profiles relating to the personalized battery holders can also be stored by the users on an Internet page. Users can contact one another via the web page. The page supports all the criteria which promote interaction between the users. It is possible, for example, for the users or the operator to initiate events. The degree of publication of the profiles which are created can be defined. If two users approach one another on a road up to a specified distance the user profiles or parts, thereof or other messages can then be replaced according to a predefinable schedule. It is, for example, also possible to transfer personal data if a user approaches a geographically defined location up to a certain distance.

The situation of the police on an electric bicycle: the police patrolman on an electric bicycle has the possibility of using the battery holder to make contact with the police station, for example by radio. Data stored in the battery holder can be called in situ. Further devices which require current have a relatively long service life with the large-capacity battery or accumulator which is arranged in the battery holder.

A military situation: similar to the police, military personnel have an increased electrical energy requirement for certain devices, for example radio devices or night vision devices. This requirement is covered with the large-capacity battery or accumulator which is arranged in the battery holder.

The situation of emergency doctors: similar to the police, emergency doctors have an increased electrical energy requirement for certain devices, for example breathing equipment. This requirement is covered with the large-capacity battery or accumulator which is arranged in the battery holder.

The situation of working in a natural setting: the user can ride with the electric bicycle into a recreation area and make use of an increased energy capacity for his electronic equipment in situ in a natural setting. The battery holder has a low-voltages connection, for example corresponding to a cigarette lighter in a car.

Further advantageous embodiments and combinations of features of the invention emerge from the following description of details and the totality of the patent claims.

BRIEF DESCRIPTION OF THE DRAWINGS

In the drawings which are used to explain the exemplary embodiment.

Basically, identical parts are provided with identical reference symbols in the figures.

Embodiments of the Invention

Figure 1:
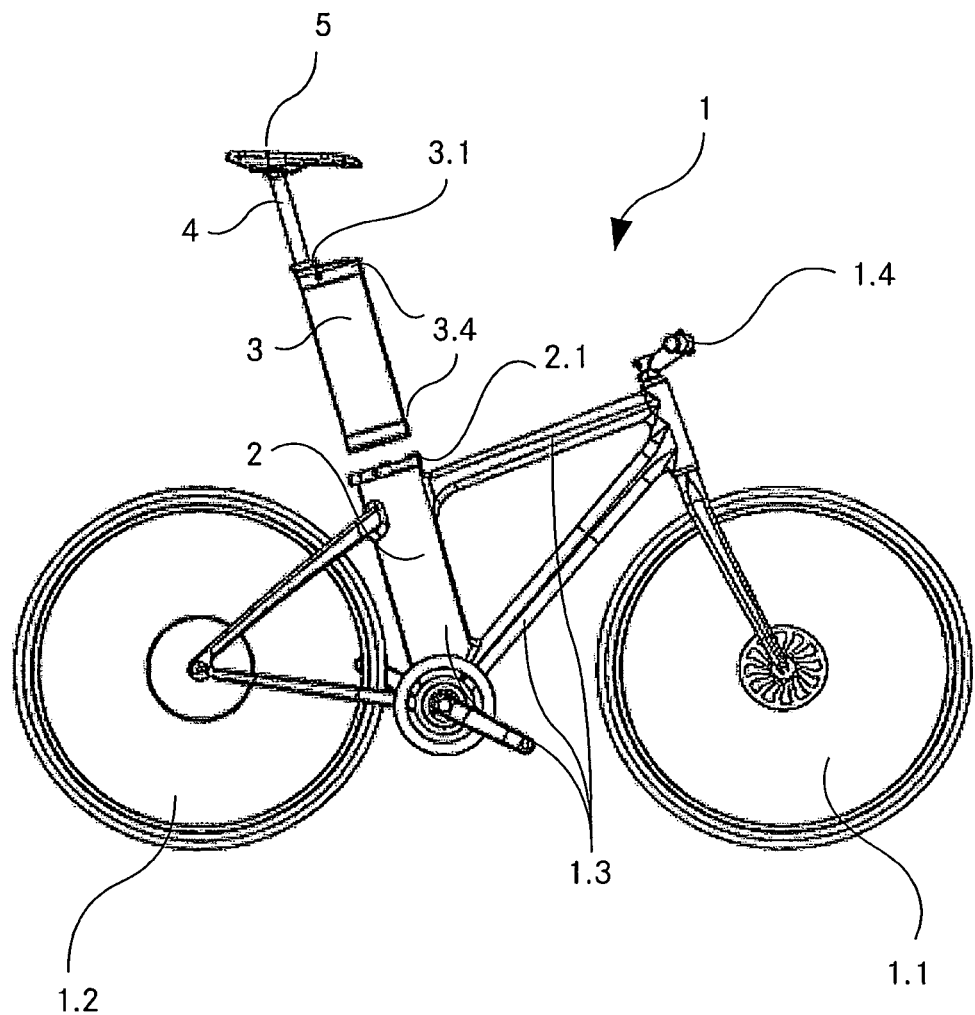
FIG. 1 is a side view of an electric bicycle with a pulled-out battery holder with a bicycle saddle.

FIG. 1 is a schematic view of an electric bicycle 1 with a front wheel 1.1, a rear wheel 1.2, a frame 1.3 with a seat tube 2 and handlebars 1.4. The front wheel 1.1 is connected via the front fork to the handlebars 1.4 which are arranged on the frame 1.3. The rear wheel 1.2 is connected via the rear structure to the frame 1.3. The design of such an electric bicycle is known in the prior art and also comprises, in particular, a pedal device, brakes and an electric motor. More details will not be given on these devices at this point. A battery holder 3 is configured to be inserted into the seat tube 2 and pulled out. The battery holder 3 is shown in the pulled-out state in FIG. 1. The battery holder 3 is connected to a saddle pillar 4, to which a bicycle saddle 5 is attached. As shown in the pulled-out state in FIG. 1, bicycle saddle 5 and battery holder 3 constitute a removable unit. The saddle pillar 4 and the bicycle saddle 5 may be commercially available components. A quick-action closure 2.1 for securing the battery holder 3 in the inserted state is attached to the seat tube 2. A quick-action closure 3.1 for fastening the saddle pillar 4 to the battery holder 3 or permitting the saddle pillar 4 to be displaced with respect to the battery holder 3 is also attached to the battery holder 3. The quick-action closure 3.1 of the battery holder 3 can be integrated into the cover of the battery holder 3 or a commercially available quick-action fastener can be used.

The battery holder 3 is manufactured, for example, from aluminium, from stainless steel, from a dimensionally stable plastic or from some other dimensionally stable material and has an interior space for accommodating batteries and/or accumulators with a capacity which is necessary for the operation of the electric bicycle. For this purpose, subdivisions and/or holders may be provided in the interior space in the battery holder 3. Cooling devices, such as for example ducts or ribs for suitable air circulation in order to avoid overheating of the batteries or of the accumulators, can be provided in the interior space or on the outside.

Between the battery holder 3 and the seat tube 2 it is possible to provide sliding devices such as, for example, a collar 3.4 so that the smallest possible sliding resistance occurs when the battery holder 3 is pushed in and pulled out, and so that the surface of the battery holder is not scratched by the pushing in and pulling out. The sliding devices can be attached to the battery holder 3 and/or to the seat tube 2.

Figure 2:
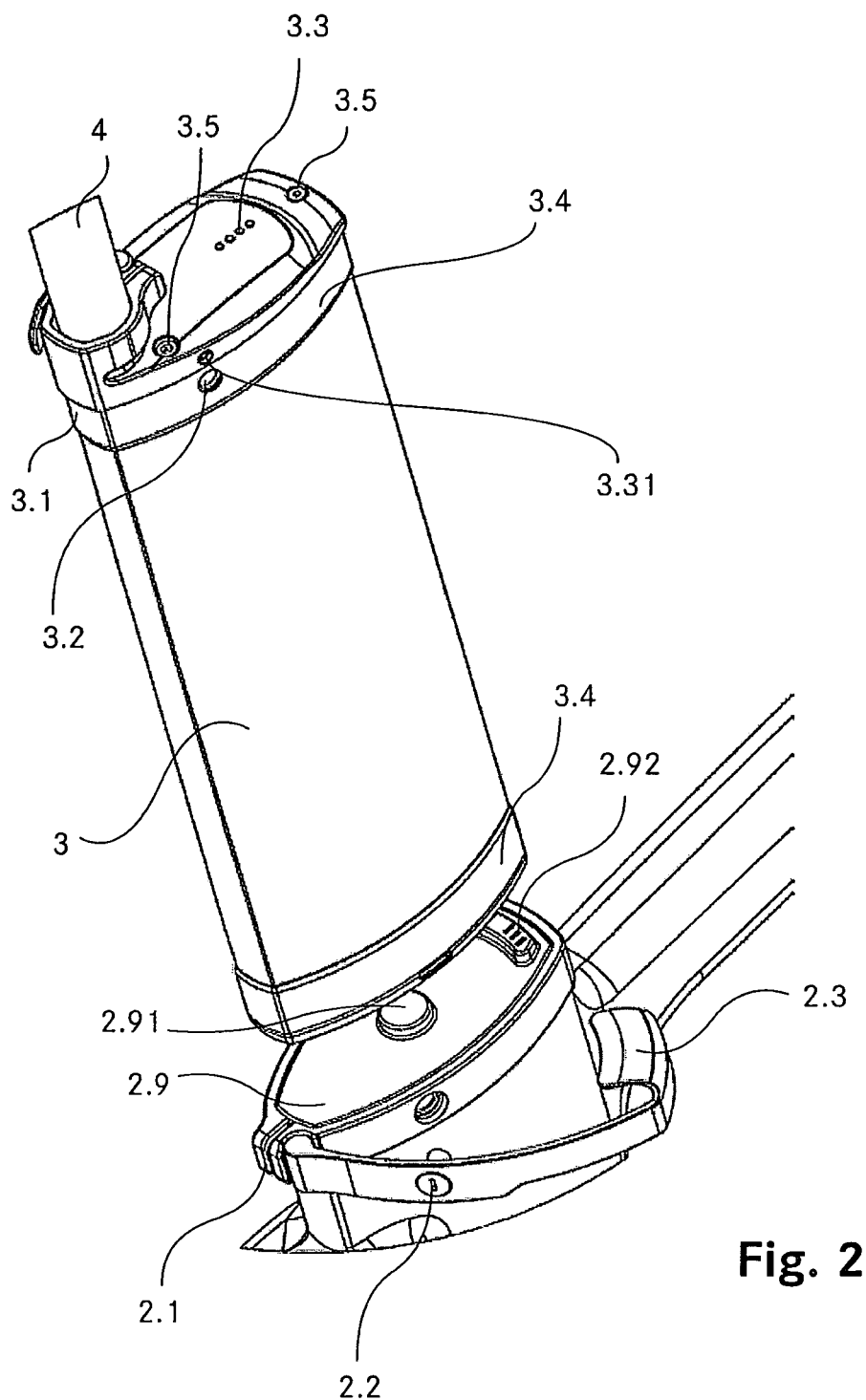
FIG. 2 is a view of a detail of the pulled-out battery holder and of the tube opening in the seat tube of an electric bicycle.

FIG. 2 is a schematic view of a detail of the battery holder 3 and the seat tube 2. A quick-action closure 2.1 is attached to the tube opening in the seat tube 2. The tube opening is closed off by a cover 2.9 which is displaceably guided in the seat tube 2 and is pushed into the seat tube 2 by the battery holder 3 during the pushing-in process.

The quick-action closure 2.1 of the seat tube 2 has a lock 2.2 which can be connected to the corresponding lock component 3.2 of the battery holder 3 so that the battery holder 3 can be secured against theft in the pushed-in state.

The cover 2.9 has a positioning knob 2.91 which engages in a corresponding depression in the battery holder 3. As a result, a defined relatively position is provided between the battery holder 3 and the cover 2.9.

The cover 2.9 also has electrical contact points 2.92 which form an electrical contact with opposing contact points of the battery holder 3.

A protective projection 2.3 for protecting the electric contact points 2.92 in particular against influences of the weather such as rain or snow when the battery holder 3 is removed and the quick-action closure 2.1 is closed is provided on the operator lever of the quick-action closure 2.1 of the seat tube 2.

The battery holder has, on an upper side, a charge state display 3.3 which displays, for example, after activation by a switch (not shown), the charge state of the batteries or accumulators arranged in the battery holder. In addition, a charge plug socket 3.31 for forming an electrical connection to a charge station and charging an accumulator arranged in the battery holder 3 is provided on an upper side of the battery holder.

A collar 3.4, which is manufactured, for example, from a slidable plastic and ensures easy displacement of the battery holder 3 with respect to the seat tube 2, is provided at the upper end of the battery holder 3. Further collars may be provided at further locations such as, for example, the lower end of the battery holder 3.

The cover and/or the floor of the battery holder 3 are secured with screws 3.5, with the interior space of the battery holder being sealed in a weather-proof fashion.

Figure 3:
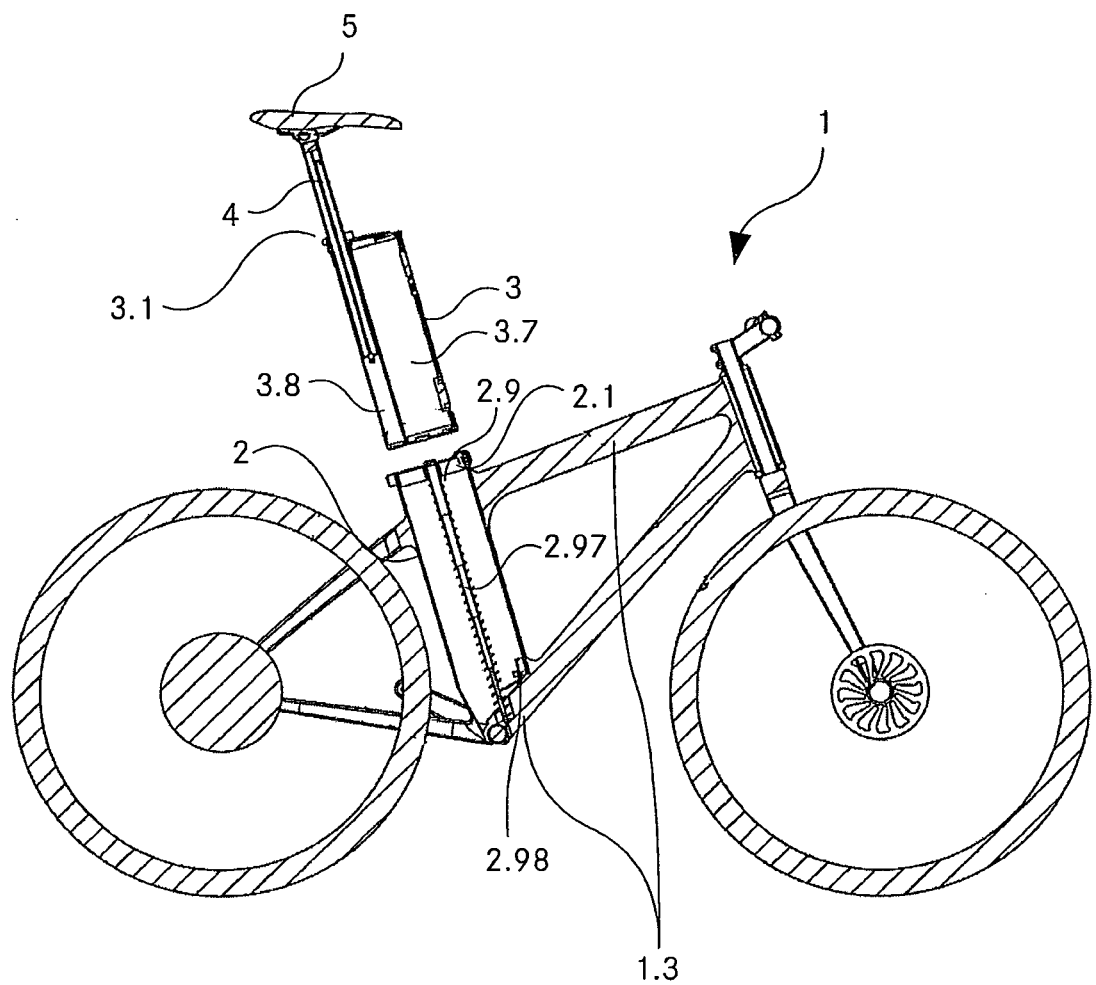
FIG. 3 shows a cross section through a pulled-out battery holder and through the seat tube of an electric bicycle.

FIG. 3 is a schematic view of a telescopic rod 2.97 which is arranged in the seat tube 2. The telescopic rod 2.97 is anchored on one side in a lower region of the seat tube 2 in the frame 1.3 of the electric bicycle 1. On the other side, the telescopic rod 2.97 is connected to the cover 2.9.

The telescopic rod serves as a guide with a compression spring so that the cover 2.9 is pressed upward, and the tube opening in the seat tube 2 is therefore closed. Furthermore, the maximum travel of the cover 2.9 or the highest position at the upper end of the seat tube can be defined by means of the telescopic rod so that the cover 2.9 comes to rest at the level of the tube opening in the seat tube 2 when the battery holder is removed. In order to give rise to a good sealing effect, seals may be provided in the region of the opening in the tube, with a suitable spring force giving rise to a seal between the seat tube 2 and the cover 2.9. A seal of this type for example is formed, with a collar provided at the upper end of the seat tube 2. If such a collar is not provided on the seat tube 2 but rather on the battery holder 3, the seal is achieved by closing the quick-action closure and the associated clamping effect on the cover 2.9.

As is shown in FIG. 3, the battery holder 3 has a battery space 3.7 and a saddle pillar space 3.8. The saddle pillar space 3.8 may be formed by a cylindrical tube. The battery space 3.7 may be substantially round, oval or have a cross-sectional face which is composed of a plurality of oval, straight or round segments and is triangular, rectangular or polygonal or defined by a spline, with part of this cross-sectional face being covered by the cross-sectional face of the saddle pillar space 3.8. The description of the cross-sectional face of the battery holder 3 and of the saddle pillar space 3.8 follows the following criteria:—easy subsequent working of an extruded profile, which is used if appropriate;—optimum use of space in terms of the usable battery space;—good ergonomy with minimum impact risks and injury risks when riding or getting onto the bicycle;—streamlined shape;—the possibility of installing electrical or electronic components in defined areas (which have a contour which is as flat as possible);—a good clamping effect or transmission of force by the quick-action closure of the seat tube 2;—the possibility of engaging around the battery holder in a way which is optimum in terms of ergonomy during removal and installation and for transportation;—the possibility of being able to carry the battery holder 3 by means of a strap in a way which is optimum in terms of ergonomy, for example around the person's shoulder or on their back;—a cover face of the battery holder which can be used well and seen well during travel or in the stationary state (integration of status display, switch, display etc.);—the possibility of virtually parallel insertion of a lock 2.2, provided on the quick-action fastener of the seat tube, into the corresponding lock element 3.2 on the battery holder 3 or the cover of the seat tube 2 allowing for appropriate positioning of the pivot point of the quick-action fastener and the position of the lock 2.2;—an installation direction which can be clearly recognized visually with obvious relative positioning in relation to the electrical contacts;—and the possibility of simple, secure and cost-effective sealing of the cover, bottom and body of the battery holder.

Figure 4:
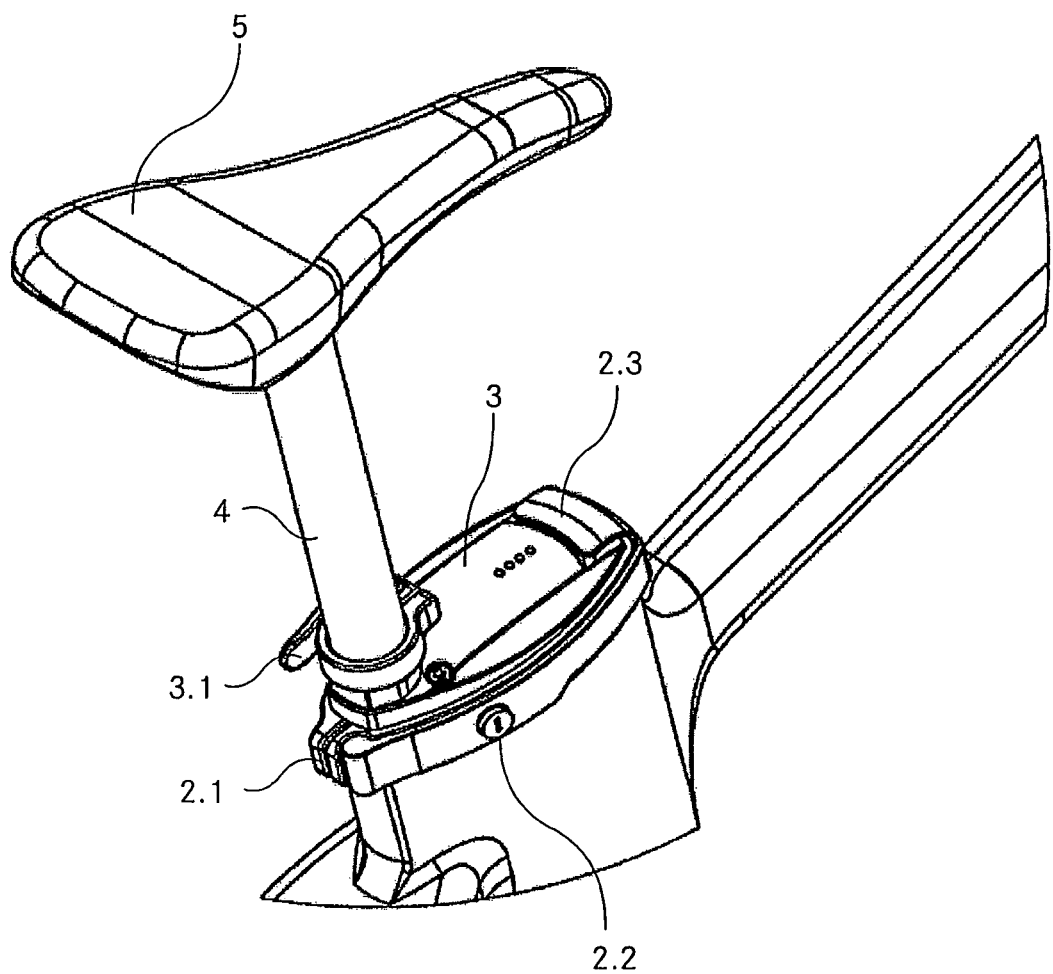
FIG. 4 is a view of a detail of the battery holder with a bicycle saddle which is inserted into the seat tube of an electric bicycle.

FIG. 4 shows a battery holder 3 which is pushed completely into the seat tube 2. The quick-action fastener 2.1 of the seat tube 2 is closed. The lock 2.2 is, for example, in a closed state so that the quick-action fastener 2.1 cannot be opened and the battery holder 3 is arranged protected against theft in the seat tube 2. The protective projection 2.3 of the quick-action fastener 2.1 covers an area of an upper cover of the battery holder 3, with additional securing means being formed before the battery holder 3 is pulled out.

Figure 5:
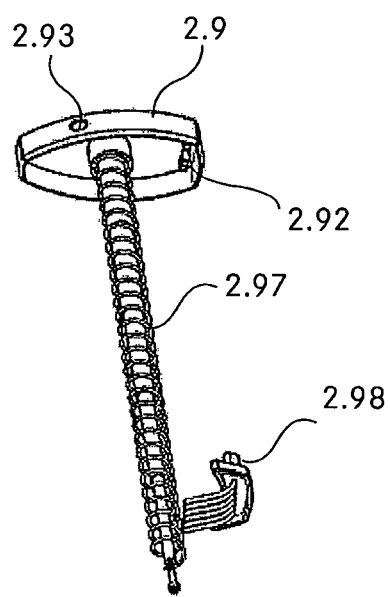
FIG. 5 is a detailed vie of the telescopic rod associated with the seat tube of the invention.

FIG. 5 shows the telescopic rod 2.97 which is connected to the cover 2.9. This arrangement is provided in a seat tube 2 (not shown), with opposing contacts 2.98, with which electrical contact is formed between contact points 2.92 of the cover 2.9 as soon as the cover 2.9 is pressed to the level of the opposing contacts 2.9 by the battery holder 3, are mounted at a lower end of the seat tube. The opposing contacts 2.9 are connected via lines to the control electronics and/or to the electric motor of the electric bicycle 1.

As shown in FIG. 5, the cover 2.9 may comprise a corresponding lock component 2.93 so that when the battery holder 3 is removed the cover 2.9 can be secured in the upper position and therefore protected against pressing in in the event of vandalism.

Figure 6:
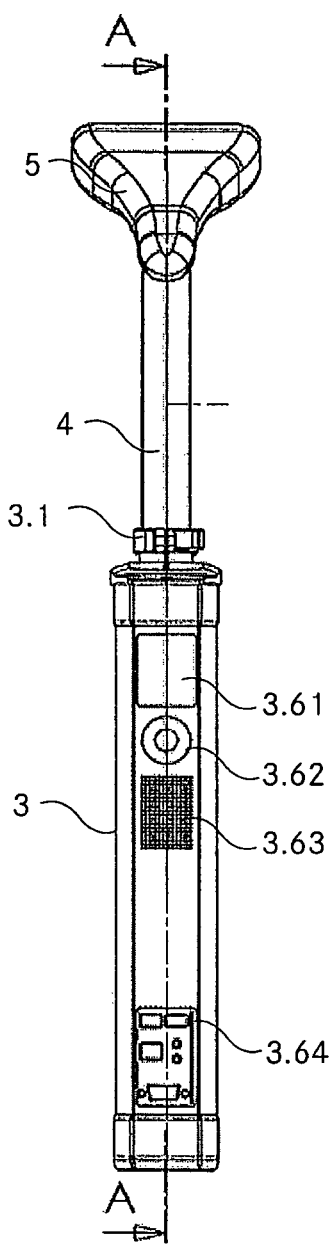
FIG. 6 is a front view of a battery holder of the invention.

FIG. 6 shows the front view of the battery holder 3 with the saddle pillar 4, the bicycle saddle 5 and the quick-action fastener 3.1. Electrical and/or electronic components 3.61, 3.62, 3.63, 3.64 such as data interfaces or energy supply interfaces, operator control elements, displays, loudspeakers, lights or any other components, are located on the front side. The electrical and/or electronic components 3.61, 3.62, 3.63, 3.64 are provided on the front side in FIG. 6 by way of example. Of course, they can be arranged at any other location on the surface of the battery holder 3 or even entirely or partially inside the battery holder 3.

To summarize it is to be noted that a battery holder with a bicycle saddle is provided which provides new possibilities for the shaping and the design of an electric bicycle and can be easily removed from the electric bicycle, as well as permitting simple handling and improving protection against theft.

The invention claimed is:

1. Battery holder which is configured to be inserted into a tube opening in a seat tube of a frame of an electric bicycle and to be pulled out, wherein the battery holder has a saddle pillar and a saddle pillar space for accommodating the saddle pillar to connect a bicycle saddle to the battery holder via the saddle pillar, wherein the saddle pillar space for accommodating the saddle pillar is to be inserted into and to be pulled out from the seat tube together with the battery holder.

2. Battery holder according to claim 1, wherein the cross-sectional area of the battery holder is larger than the cross-sectional area of the saddle pillar space, in particular 2 to 20 times larger.

3. Battery holder according to claim 1, wherein the saddle pillar is attached to the battery holder in such a way that it can be displaced in relation to the battery holder.

4. Battery holder according to claim 3, wherein the battery holder has a substantially oval cross-sectional face or a cross-sectional face which is composed of a plurality of oval, straight or round segments, and in that the saddle pillar has a substantially round cross-sectional face, wherein the saddle pillar is guided so as to be displaceable in a round tube which is attached to the battery holder, and said saddle pillar can be locked to a quick-action closure.

5. Battery holder according to claim 1, wherein a pull-out strap is arranged on the battery holder.

6. Battery holder according to claim 1, wherein electrical and/or electronic components, such as, in particular, a battery or an accumulator, a transformer, a charge station for charging the battery or the accumulator, a charge state display, a power connection for the power supply of the electric bicycle, a power connection for external devices, a lamp, a computer module, a wire-bound or wireless interface, a display, loudspeaker and/or a global positioning system module, are attached to the battery holder.

7. Seat tube of the frame of an electric bicycle for accommodating a battery holder according to claim 1, wherein a quick-action closure for securing the battery holder is attached to the seat tube.

8. Seat tube according to claim 7, wherein opposing contacts for forming an electrical connection between the power connection of the battery holder and electrical components such as, in particular, the motor of the electric bicycle are attached in the seat tube.

9. Seat tube according to claim 7 or 8, wherein a cover is displaceably guided in the seat tube, so that the tube opening in the seat tube is closed off in a weatherproof fashion when the battery holder is removed.

10. Seat tube according to claim 9, wherein a mechanical force, which is generated, in particular, by a spring or hydraulic/pneumatic means, acts on the cover in the direction of the upper end of the seat tube.

11. Seat tube according to claim 9, wherein a protective projection is provided on the quick-action closure so that, when the battery holder is removed, the electrical contact points which are attached to the cover are protected against influences of the weather.

12. Seat tube according to claim 7, wherein the battery holder and/or the cover can be secured, in particular against theft and/or vandalism, with a closing device.

13. Seat tube according to claim 12, wherein a secured mechanical connection between the quick-action closure, the seat tube and the battery holder or the cover can be provided with the closure device.

14. Battery holder according to claim 1, wherein the saddle pillar space is formed by a cylindrical tube.

15. Electric bicycle, comprising
   a) a frame having a seat tube;
   b) battery holder which is configured to be inserted into the tube opening in the seat tube and to be pulled out;
   c) a saddle pillar,
   d) a bicycle saddle,
   wherein the saddle pillar is attached to the battery holder such that the bicycle saddle is connected to the battery holder via the saddle pillar, and
   the saddle pillar is to be inserted into and to be pulled out from the seat tube together with the battery holder.

16. Electric bicycle according to claim 15, wherein the cross-sectional area of the battery holder is larger than the cross-sectional area of the saddle pillar, in particular 2 to 20 times larger.

17. Electric bicycle according to claim 15, wherein the saddle pillar is attached to the battery holder in such a way that it can be displaced in relation to the battery holder.

18. Electric bicycle according to claim 17, wherein the battery holder has a substantially oval cross-sectional face or a cross-sectional face which is composed of a plurality of oval, straight or round segments, and in that the saddle pillar has a substantially round cross-sectional face, wherein the saddle pillar is guided so as to be displaceable in a round tube which is attached to the battery holder, and said saddle pillar can be locked to a quick-action closure.

19. Electric bicycle according to claim 15, wherein the saddle pillar is arranged in a fixed fashion with respect to the battery holder.

20. Electric bicycle according to claim 15, wherein a pull-out strap is arranged on the battery holder.

21. Electric bicycle according to claim 15, wherein electrical and/or electronic components, such as, in particular, a battery or an accumulator, a transformer, a charge station for charging the battery or the accumulator, a charge state display, a power connection for the power supply of the electric bicycle, a power connection for external devices, a lamp, a computer module, a wire-bound or wireless interface, a display, loudspeaker and/or a global positioning system module, are attached to the battery holder.

22. Electric bicycle according to claim 15, wherein a cover is displaceably guided in the seat tube.

23. Battery holder which is configured to be inserted into a tube opening in a seat tube of a frame of an electric bicycle and to be pulled out, comprising a removable unit having a saddle connected to the battery holder, the battery holder having a battery arranged therein, the removable unit being operable as a seatpost that is inserted from above into the seat tube, the removable unit being such that upon removal from the seat tube, both the saddle and the battery holder are simultaneously removed from the electric bicycle.

24. Battery holder according to claim 23, the battery holder being securable in the seat tube.

25. Battery holder according to claim 23, the battery holder being displaceable in the seat tube in order to set the height of the bicycle saddle.

26. Battery holder according to claim 23, wherein the battery holder has a substantially oval cross-sectional face or a cross-sectional face which is composed of a plurality of oval, straight or round segments.

27. Battery holder according to claim 23, wherein a pull-out strap is arranged on the battery holder.

28. Battery holder according to claim 23, wherein electrical and/or electronic components, such as, in particular, a battery or an accumulator, a transformer, a charge station for charging the battery or the accumulator, a charge state display, a power connection for the power supply of the electric bicycle, a power connection for external devices, a lamp, a computer module, a wire-bound or wireless interface, a display, loudspeaker and/or a global positioning system module, are attached to the battery holder.

* * * * *